US012077154B2

(12) United States Patent
Arima et al.

(10) Patent No.: US 12,077,154 B2
(45) Date of Patent: Sep. 3, 2024

(54) VEHICLE MOTION CONTROL DEVICE, VEHICLE MOTION CONTROL METHOD, AND VEHICLE MOTION CONTROL SYSTEM

(71) Applicant: Hitachi Astemo, Ltd., Hitachinaka (JP)

(72) Inventors: Hidetoshi Arima, Hitachinaka (JP); Chikara Nishiura, Hitachinaka (JP); Satoshi Kashiwamura, Hitachinaka (JP)

(73) Assignee: Hitachi Astemo, Ltd, Hitachinaka (JP)

( * ) Notice: Subject to any disclaimer, the term of this patent is extended or adjusted under 35 U.S.C. 154(b) by 310 days.

(21) Appl. No.: 17/627,032

(22) PCT Filed: May 25, 2020

(86) PCT No.: PCT/JP2020/020455
§ 371 (c)(1),
(2) Date: Jan. 13, 2022

(87) PCT Pub. No.: WO2021/014741
PCT Pub. Date: Jan. 28, 2021

(65) Prior Publication Data
US 2022/0266823 A1    Aug. 25, 2022

(30) Foreign Application Priority Data
Jul. 25, 2019    (JP) .................... 2019-136815

(51) Int. Cl.
*B60T 7/12* (2006.01)
*B60W 10/04* (2006.01)
(Continued)

(52) U.S. Cl.
CPC ............ *B60W 30/10* (2013.01); *B60W 10/04* (2013.01); *B60W 10/18* (2013.01); *B60W 10/20* (2013.01);
(Continued)

(58) Field of Classification Search
CPC . B60T 7/12; B60T 8/17; B60W 10/04; B60W 10/18; B60W 30/02; B60W 30/10
See application file for complete search history.

(56) References Cited

U.S. PATENT DOCUMENTS

| | | | |
|---|---|---|---|
| 2011/0015850 A1* | 1/2011 | Tange | B60W 30/12 701/116 |
| 2015/0336607 A1* | 11/2015 | Inoue | B60W 30/10 701/41 |

(Continued)

FOREIGN PATENT DOCUMENTS

| | | |
|---|---|---|
| EP | 2 248 710 A1 | 11/2010 |
| JP | 2018-2096 A | 1/2018 |
| WO | WO 2014/115262 A1 | 7/2014 |

OTHER PUBLICATIONS

International Preliminary Report on Patentability (PCT/IB/338 & PCT/IB/373) issued in PCT Application No. PCT/JP2020/020455 dated Feb. 3, 2022, including English translation of document C2 (Japanese-language Written Opinion (PCT/ISA/237) filed on Jan. 13, 2022) (six (6) pages).

(Continued)

*Primary Examiner* — Tan Q Nguyen
(74) *Attorney, Agent, or Firm* — Crowell & Moring LLP

(57) ABSTRACT

A vehicle motion control device according to the present invention obtains a translation force for causing the position of a vehicle to trace a target travel path, on the basis of a lateral displacement amount which is an amount of displacement of the vehicle in a lateral direction with respect to a target movement point, obtain a rotational force for correcting an orientation of the vehicle with respect to the target travel path, on the basis of an orientation displacement amount which is an amount of displacement of the vehicle in a yaw direction with respect to the target movement point, weight the translation force and the rotational force on the (Continued)

basis of specifications relating to traveling of the vehicle, and output a control command for achieving a target lateral force obtained by adding up the weighted translation force and the weighted rotational force.

8 Claims, 12 Drawing Sheets

(51) Int. Cl.
  *B60W 10/18* (2012.01)
  *B60W 10/20* (2006.01)
  *B60W 30/10* (2006.01)
  *B60W 50/00* (2006.01)

(52) U.S. Cl.
  CPC ..... *B60W 50/00* (2013.01); *B60W 2050/0022* (2013.01); *B60W 2520/10* (2013.01); *B60W 2520/14* (2013.01); *B60W 2552/30* (2020.02)

(56) References Cited

U.S. PATENT DOCUMENTS

2016/0264135 A1* 9/2016 Yamakado ...... B60W 30/18145
2019/0106149 A1 4/2019 Kunihiro et al.

OTHER PUBLICATIONS

Extended European Search Report issued in European Application No. 20844894.4 dated Jul. 31, 2023 (8 pages).
International Search Report (PCT/ISA/210) issued in PCT Application No. PCT/JP2020/020455 dated Aug. 18, 2020 with English translation (five (5) pages).
Japanese-language Written Opinion (PCT/ISA/237) issued in PCT Application No. PCT/JP2020/020455 dated Aug. 18, 2020 (four (4) pages).

* cited by examiner

RATE OF CHANGE IN CURVATURE (INDEX VALUE RWI = VEHICLE WIDTH/LANE WIDTH)

WIDE ⇐ WIDTH OF ⇒ NARROW
LANE

DECELERATION ⇒ HIGH (SUDDEN DECELERATION)

VEHICLE MOTION CONTROL DEVICE, VEHICLE MOTION CONTROL METHOD, AND VEHICLE MOTION CONTROL SYSTEM

TECHNICAL FIELD

The present invention relates to a vehicle motion control device, a vehicle motion control method, and a vehicle motion control system that allow a vehicle to follow a target travel path.

BACKGROUND ART

The travel control device of Patent Document 1 detects the displacement amount $\Delta Y$ in a vehicle width direction between a set target course and a travel path of the vehicle, a displacement amount $\theta y$ in a yaw direction between the travel path of the vehicle and the target course, calculates a target lateral acceleration $\Delta ddy$ for returning the vehicle to the target course on the basis of the displacement amount $\Delta Y$, and calculates a target yaw rate $\Delta \gamma$ for causing the vehicle to travel along the target course on the basis of the displacement amount $\theta y$.

The travel control device of Patent Document 1 calculates a target steering angle $\Delta A steer$ on the basis of the target lateral acceleration $\Delta ddy$ and performs steering control, and calculates a yaw moment $\Delta Mz$ added to the vehicle on the basis of the target yaw rate $\Delta \gamma$ and the executed steering control, to control distribution of braking and driving forces.

REFERENCE DOCUMENT LIST

Patent Document

Patent Document 1: JP 2018-002096 A

SUMMARY OF THE INVENTION

Problem to be Solved by the Invention

In vehicle motion control in which the position control amount based on the lateral displacement amount of the vehicle with respect to a target movement point on a target travel path and the posture control amount based on the yaw direction displacement amount of the vehicle with respect to the target movement point are individually set, the position and posture of the vehicle with respect to the target travel path cannot be adjusted in a well-balanced manner in accordance with travel conditions, and there is a risk that the course traceability and behavior stability suitable for the travel conditions cannot be balanced.

The present invention was made in view of the circumstances of the prior art, and an object thereof is to provide a vehicle motion control device, a vehicle motion control method, and a vehicle motion control system that are capable of improving the balance between course traceability and behavior stability in accordance with travel conditions.

Means for Solving the Problem

According to the present invention, in one aspect thereof, a translation force for tracing the position of a vehicle on a target travel path is obtained on the basis of a lateral displacement amount, which is an amount of lateral displacement of the vehicle with respect to a target movement point on the target travel path, a rotational force for correcting an orientation of the vehicle with respect to the target travel path is obtained on the basis of an orientation displacement amount, which is the amount of displacement of the vehicle in a yaw direction with respect to the target movement point, a weighted translation force and a weighted rotation force are obtained by weighting the translation force and the rotational force on the basis of specifications relating to traveling of the vehicle, and a control command for achieving a target lateral force obtained by adding the weighted translation force and the weighted rotational force is output to a braking actuator, a driving actuator, and a steering actuator.

Effects of the Invention

According to the present invention, the balance between course traceability and behavior stability can be improved in accordance with travel conditions.

MODE FOR CARRYING OUT THE INVENTION

Embodiments of a vehicle motion control device, a vehicle motion control method, and a vehicle motion control system according to the present invention are now described hereinafter with reference to the drawings.

Figure 1:
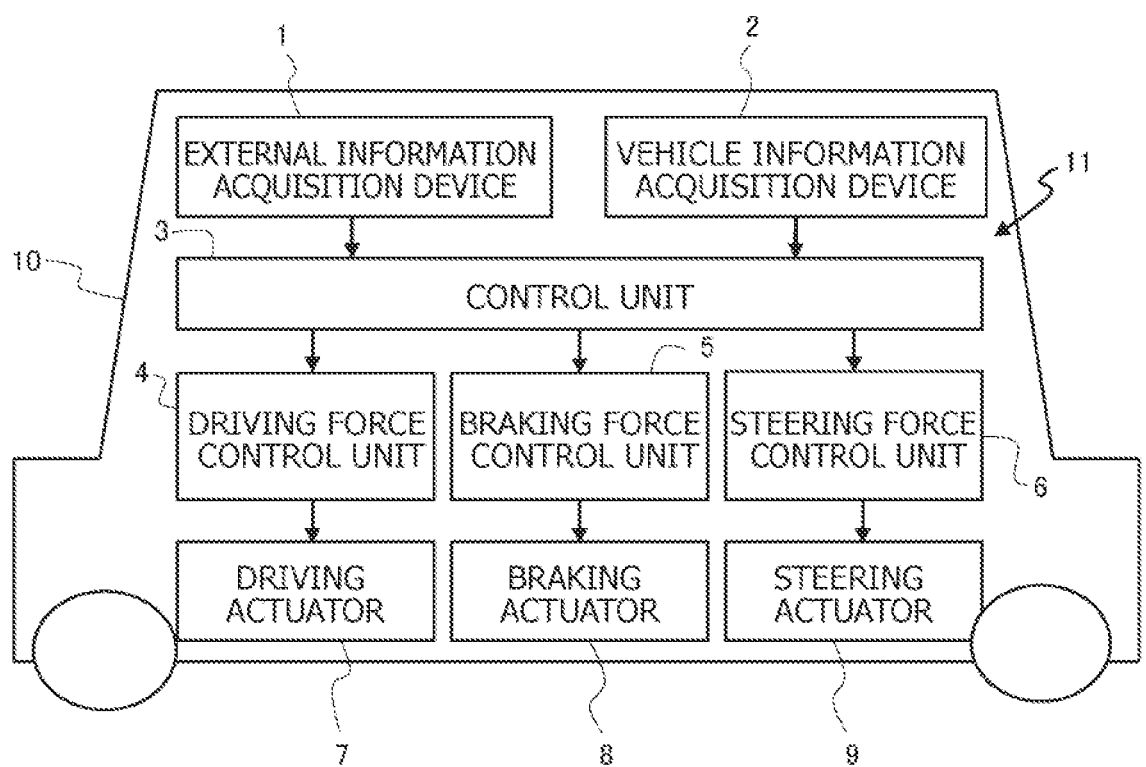
FIG. 1 is a configuration block diagram of a vehicle motion control system.

FIG. 1 is a configuration block diagram of a vehicle motion control system 11 provided in a vehicle 10.

Vehicle motion control system 11 is a system that controls the control braking and driving forces and a steering force of vehicle 10 in order to allow vehicle 10 to follow a target travel path.

Vehicle motion control system 11 includes an external information acquisition device 1, a vehicle information acquisition device 2, a control unit 3, a driving force control unit 4, a braking force control unit 5, a steering force control unit 6, a driving actuator 7, a braking actuator 8, and a steering actuator 9.

As an external recognition unit, external information acquisition device 1 is a device for acquiring external information such as information on a position or travel environment where vehicle 10 travels, and is composed of a camera device such as a stereo camera, a monocular camera, or an omnidirectional camera, a radar device such as a laser radar or a millimeter wave radar, a sonar, high-precision map data, and the like.

Control unit 3 obtains a target travel path on which vehicle 10 travels, on the basis of the external information acquired by external information acquisition device 1.

Vehicle information acquisition device 2 is a device for acquiring various information about vehicle 10, and is composed of a sensor that detects a traveling speed of vehicle 10 (referred to as "vehicle speed," hereinafter), a sensor that detects an acceleration in a front-rear direction and an acceleration in a left-right direction of vehicle 10, a sensor that detects a load of vehicle 10, a sensor that captures a tendency to understeer or oversteer of vehicle 10, and the like.

As a vehicle motion control device, control unit 3 is an electronic control device mainly composed of a microcomputer including a processor, a memory, an I/O, and a bus connecting these components.

Control unit 3 calculates a target driving force, a target braking force, and a target steering force on the basis of external information acquired by external information acquisition device 1 and information on vehicle 10 acquired by vehicle information acquisition device 2, outputs a signal relating to the target driving force to driving force control unit 4, outputs a signal relating to the target braking force to braking force control unit 5, and outputs a signal relating to the target steering force to steering force control unit 6.

Here, control unit 3 calculates a target value of a lateral force generated in a lateral direction of vehicle 10, on the basis of the information from external information acquisition device 1 and vehicle information acquisition device 2 in order to allow vehicle 10 to follow the target travel path, and freely allocates the calculated target lateral force to the driving force, the braking force, and the steering force.

In the present embodiment, the direction of the lateral force is represented by positive and negative, and for example, the left direction indicates positive and the right direction indicates negative.

Then, driving force control unit 4 controls driving actuator 7 such as an engine or a motor on the basis of the signal relating to the target driving force, and braking force control unit 5 controls braking actuator 8 such as a hydraulic braking device on the basis of the signal relating to the target braking force, and steering force control unit 6 controls steering actuator 9 such as an electric power steering device on the basis of the signal relating to the target steering force.

Figure 2:
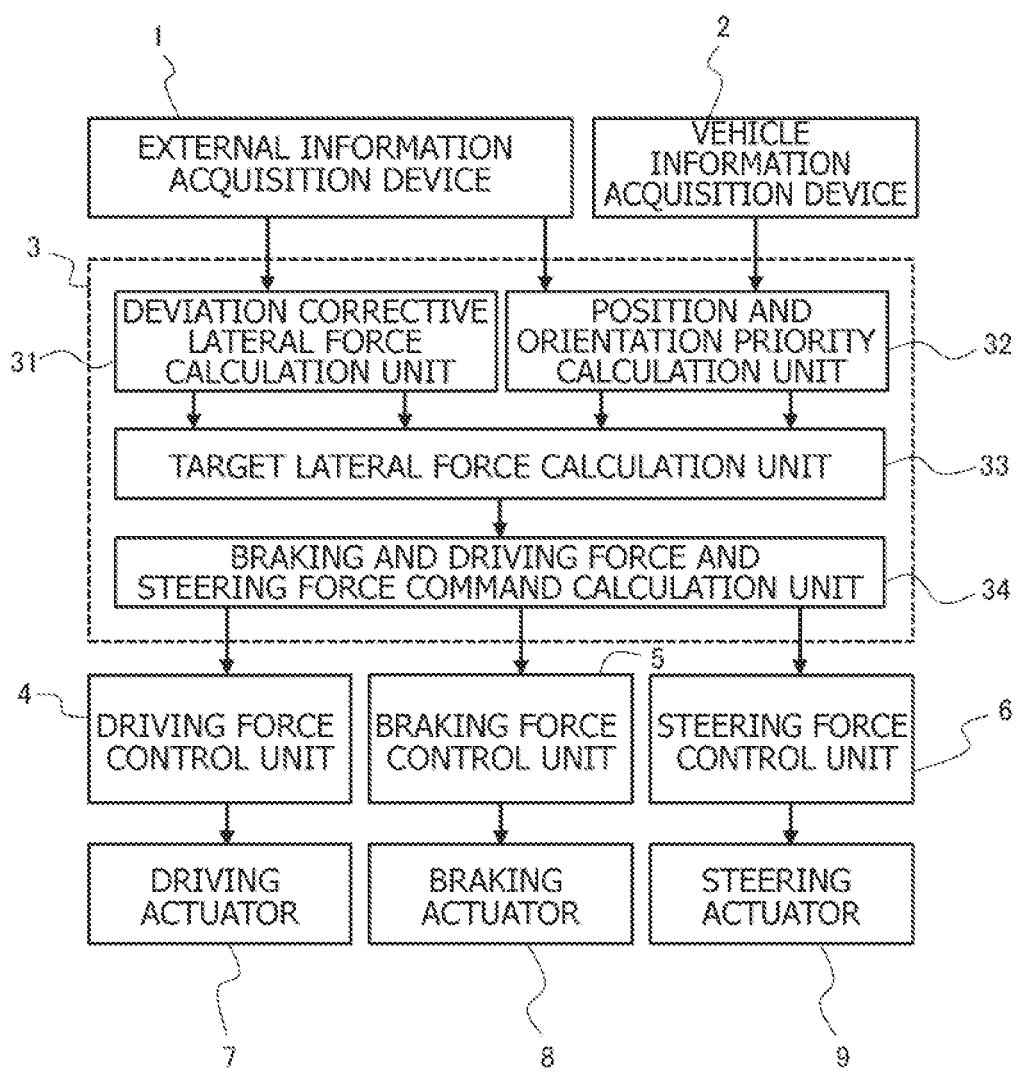
FIG. 2 is a functional block diagram of a control unit as a vehicle motion control device.

FIG. 2 is a functional block diagram of control unit 3.

Control unit 3 has a function as a controller that obtains the target lateral force for allowing vehicle 10 to follow the target travel path and outputs a control command for achieving the target lateral force to each of actuators 7 to 9.

Control unit 3 includes a deviation corrective lateral force calculation unit 31, a position and orientation priority calculation unit 32, a target lateral force calculation unit 33, and a braking and driving forces and steering force command calculation unit 34.

Deviation corrective lateral force calculation unit 31 acquires the target travel path on which vehicle 10 travels that is obtained on the basis of the external information acquired by external information acquisition device 1.

Deviation corrective lateral force calculation unit 31 obtains a translation force for tracing the position of vehicle 10 on the target travel path on the basis of a lateral displacement amount which is the amount of displacement of vehicle 10 in the lateral direction with respect to a target movement point in the target travel path.

Deviation corrective lateral force calculation unit 31 also obtains a rotational force for correcting the direction of vehicle 10 with respect to the target travel path on the basis of an orientation displacement amount which is the amount of displacement of vehicle 10 in a yaw direction with respect to the target movement point.

Position and orientation priority calculation unit 32 calculates a priority as a weighting variable used for a process for weighting the translation force and the rotational force, on the basis of the external information acquired by external information acquisition device 1 and the information on vehicle 10 acquired by vehicle information acquisition device 2, that is, specifications relating to traveling of vehicle 10.

The specifications relating to traveling of vehicle 10 in position and orientation priority calculation unit 32 include the understeer tendency and the oversteer tendency of vehicle 10, a rate of change in a curvature of the target travel path, a road width including the target travel path on which vehicle 10 travels, a deceleration of vehicle 10, and the like.

A correlation between the specifications relating to traveling of vehicle 10 and the priority will be described hereinafter in detail.

Target lateral force calculation unit 33 inputs the translation force and the rotational force obtained by deviation corrective lateral force calculation unit 31, and the priority obtained by position and orientation priority calculation unit 32, obtains a weighted translation force and a weighted rotational force by weighting the translation force and the rotational force, and obtains the target lateral force by adding the weighted translation force and the weighted rotational force.

Braking and driving forces and steering force command calculation unit 34 freely allocates the target lateral force obtained by target lateral force calculation unit 33 to the driving force, the braking force, and the steering force, obtains the target driving force, the target braking force, and the target steering force which are control commands for achieving the target lateral force, and outputs the control commands corresponding to respective targets to driving actuator 7, braking actuator 8, and steering actuator 9.

Figure 3:
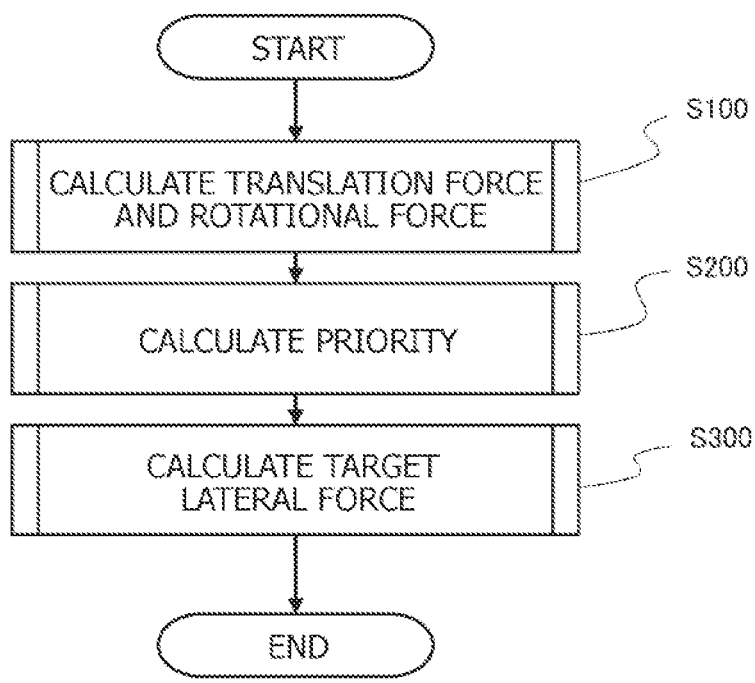
FIG. 3 is a flowchart illustrating a main routine of a process for calculating a target lateral force.

FIG. 3 is a flowchart illustrating a main routine of a process for calculating the target lateral force by control unit 3.

In step S100 (deviation corrective lateral force calculation unit 31), control unit 3 obtains the translation force for tracing the position of vehicle 10 on the target travel path on the basis of the lateral displacement amount of vehicle 10 with respect to the target movement point, and obtains the rotational force for correcting the orientation of vehicle 10 with respect to the target travel path on the basis of the orientation displacement amount of vehicle 10 in the yaw direction with respect to the target movement point.

Next, in step S200 (position and orientation priority calculation unit 32), control unit 3 obtains the priority for weighting the translation force and the rotational force obtained in S100, on the basis of the specifications relating to traveling of vehicle 10, such as the tendency to understeer and oversteer of vehicle 10.

In step S300 (target lateral force calculation unit 33), control unit 3 obtains the weighted translation force and the weighted rotational force obtained by weighting the translation force and the rotational force, on the basis of the translation force and rotational force obtained in step S100 and the priority obtained in step S200, and obtains the target lateral force by adding the weighted translation force and the weighted rotational force.

Here, the process for calculating the translation force and the rotational force by deviation corrective lateral force calculation unit 31 in step S100 will now be described in detail with reference to the flowchart of FIG. 4.

First, in step S101, control unit 3 calculates a lateral displacement amount ERTP, which is the amount of displacement of vehicle 10 in the lateral direction with respect to the target movement point, which is obtained from external information acquisition device 1, and calculates a position deviation corrective lateral force FY_ERTP on the basis of lateral displacement amount ERTP, that is, the position deviation, in accordance with Equation 1.

$$FY\_ERTP = m\frac{2}{TP^2} \times ERTP \qquad [\text{Equation 1}]$$

In Equation 1, m represents the weight of vehicle 10, and TP represents the time at which vehicle 10 wishes to reach the target movement point on the target travel path from the current position.

Here, when a motion of vehicle 10 is broken into a translation motion realized together with the center of gravity and a rotational motion realized around the center of gravity, lateral force FY_ERTP corresponds to the lateral force for the translation motion, that is, the translation force.

Then, lateral force FY_ERTP is calculated as the translation force that eliminates lateral displacement amount ERTP and causes the position of vehicle 10 to trace the target travel path.

Figure 5:
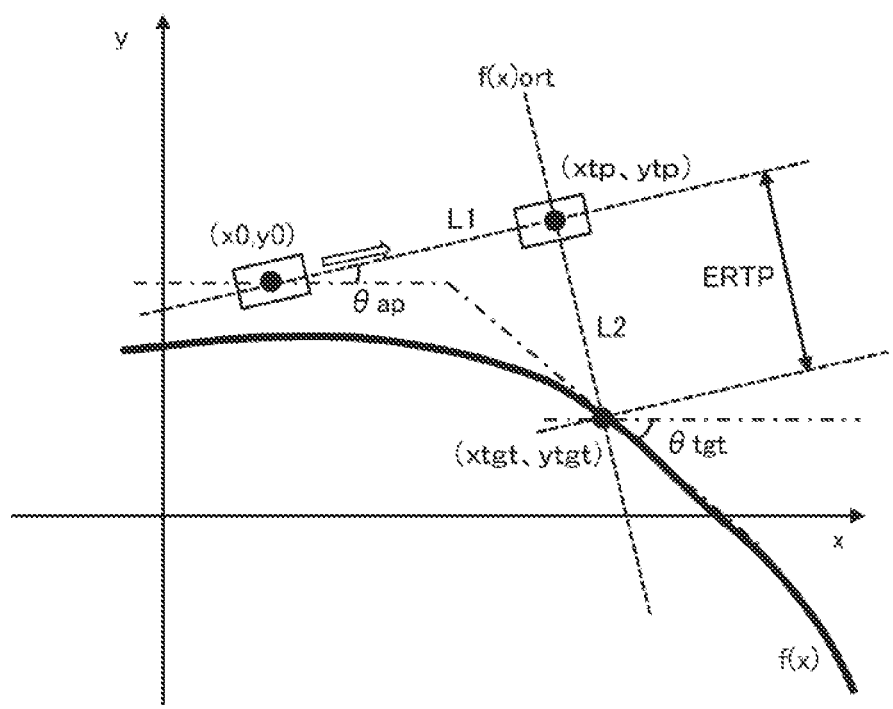
FIG. 5 is a diagram illustrating a current position, a predicted movement point, and a target movement point of a vehicle in a horizontal coordinate system.

FIG. 5 illustrates an aspect of a process for calculating lateral displacement amount ERTP. Note that FIG. 5 illustrates the current position, predicted movement point, and target movement point of vehicle 10 in a horizontal coordinate system.

Control unit 3 obtains a straight line L2 that is orthogonal to a straight line L1 connecting the current position and the predicted movement point after a time period TP and passes through the predicted movement point, obtains the point where straight line L2 intersects the target travel path as the target movement point, and obtains the distance between the predicted movement point and the target movement point as lateral displacement amount ERTP.

How to obtain lateral displacement amount ERTP is now described hereinafter in detail.

First, control unit 3 obtains coordinates (xtp, ytp) of the predicted movement point after time period TP on the basis of the coordinates (x0, y0) of the current position of vehicle 10 obtained from external information acquisition device 1 and an orientation θap of current vehicle 10, in accordance with Equation 2.

$$x_{tp} = x_0 + V \cdot TP \cdot \cos \theta_{ap}$$

$$y_{tp} = y_0 + V \cdot TP \cdot \sin \theta_{ap} \qquad [\text{Equation 2}]$$

In Equation 2, V represents the vehicle speed.

Next, control unit 3 obtains a function $f(x)_{ort}$ that is orthogonal to straight line L1 passing through the coordinates $(x_{tp}, y_{tp})$ of the predicted movement point and connecting the coordinates (x0, y0) of the current position and the coordinates $(x_{tp}, y_{tp})$ of the predicted movement point, in accordance with Equation 3.

$$f(x)_{ort} = -\frac{1}{\tan\theta_{ap}} \cdot x + y_{tp} + \frac{1}{\tan\theta_{ap}} \cdot x_{tp} \qquad [\text{Equation 3}]$$

Next, control unit 3 calculates the coordinates $(x_{tgt}, y_{tgt})$ of the target movement point from function $f(x)_{ort}$ passing through the coordinates $(x_{tp}, y_{tp})$ of the predicted movement point and a function f(x) representing the target travel path (target travel locus), in accordance with Equation 4.

$$x_{tgt} = x_{tp} + \tan \theta_{ap} \cdot (y_{tp} - f(x_{tgt}))$$

$$y_{tgt} = f(x_{tgt}) \qquad [\text{Equation 4}]$$

Control unit 3 then calculates lateral displacement amount ERTP, which is the distance between the predicted movement point and the target movement point, from the coordinates $(x_{tp}, y_{tp})$ of the predicted movement point and the coordinates $(x_{tgt}, y_{tgt})$ of the target movement point, in accordance with Equation 5.

$$ERTP = \sqrt{(x_{tgt} - x_{tp})^2 + (y_{tgt} - y_{tp})^2} \qquad [\text{Equation 5}]$$

Figure 4:
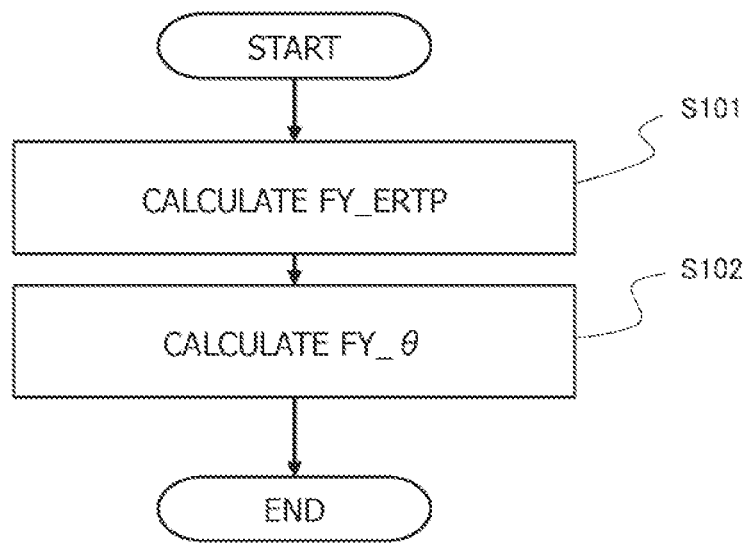
FIG. 4 is a flowchart illustrating a process for calculating a position/orientation deviation corrective lateral force.

After calculating position deviation corrective lateral force FY_ERTP in step S101 of the flowchart illustrated in FIG. 4, in step S102 control unit 3 calculates an orientation deviation corrective lateral force FY_θ in accordance with Equation 6, on the basis of an orientation displacement amount θde, which is the amount of displacement of vehicle 10 in the yaw direction with respect to the target movement point.

$$FY\_\theta = m\frac{\theta_{de}}{TP} \times V \qquad [\text{Equation 6}]$$

Here, orientation displacement amount θde is a deviation between an orientation θtgt of vehicle 10 at the target movement point when vehicle 10 traces the target travel path and an orientation θap of vehicle 10 at the present time, and is calculated according to Equation 7.

$$\theta_{de} = \theta_{tgt} - \theta_{ap} \qquad [\text{Equation 7}]$$

In the horizontal coordinate system illustrated in FIG. 5, an angle formed by a tangent line of the target travel path at the target movement point and the x-axis is the orientation θtgt, and an angle formed by straight line L1 and the x-axis is the orientation θap.

Furthermore, in the horizontal coordinate system of FIG. 5, an inclination angle in the direction in which the value of the y-coordinate drops is indicated by a plus sign, and an inclination angle in the direction in which the value of the y-coordinate increases is indicated by a minus sign. Therefore, in the example in FIG. 5, the orientation θtgt is represented by a positive angle, the orientation θap is represented by a negative angle, and the orientation displacement amount θde is a sum of the absolute value of the orientation θtgt and the absolute value of the orientation θap.

Note that, when the motion of vehicle 10 is broken into a translation motion realized together with the center of gravity and a rotational motion realized around the center of gravity, lateral force FY_θ corresponds to the lateral force for the rotational motion, that is, the rotational force.

Then, lateral force FY_θ is calculated as the rotational force for correcting the orientation of vehicle 10 with respect to the target travel path.

Figure 6:
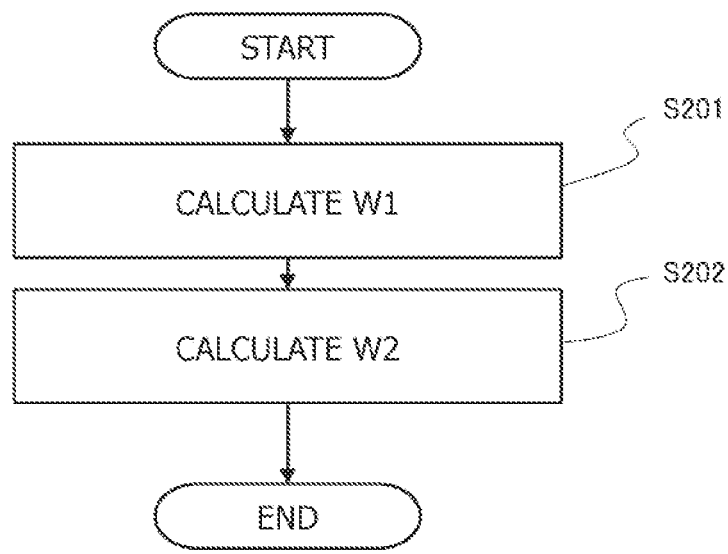
FIG. 6 is a flowchart illustrating a process for calculating a priority.

The process for calculating the priority by position and orientation priority calculation unit 32 in step S200 is described next in detail with reference to the flowchart of FIG. 6.

First, in step S201, control unit 3 calculates a priority W1 (0≤W1≤1) as a weighting variable for position deviation correction, on the basis of information relating to the specifications relating to traveling of vehicle 10, which is the information acquired by external information acquisition device 1 or vehicle information acquisition device 2.

The specifications relating to traveling of vehicle 10 that are used by control unit 3 to calculate priority W1 are information on the tendency to understeer and oversteer of vehicle 10, the rate of change in the curvature of the target travel path, the road width on which vehicle 10 travels, and travel conditions relating to vehicle behavior stability such as deceleration of vehicle 10 and course traceability of vehicle 10.

The correlation between the specifications relating to traveling of vehicle 10 and priority W1 will be described hereinafter in detail.

Next, in step S202, control unit 3 obtains a priority W2 (0≤W2≤1) as a weighting variable for orientation deviation correction, on the basis of priority W1 for position deviation correction obtained in step S201.

Here, since the relationship of Equation 8 is established, control unit 3 obtains priority W2 for the orientation deviation correction, in accordance with Equation 9.

$$W1+W2=1 \qquad \text{[Equation 8]}$$

$$W2=1-W1 \qquad \text{[Equation 9]}$$

Figure 7:
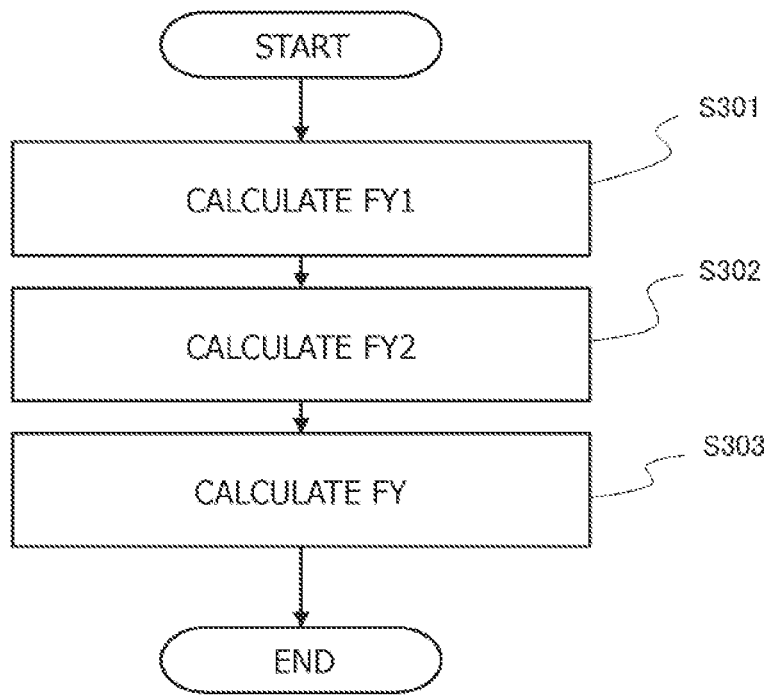
FIG. 7 is a flowchart illustrating a process for calculating a target lateral force.

The process for calculating the target lateral force in step S300 performed by target lateral force calculation unit 33 will be described hereinafter in detail with reference to the flowchart of FIG. 7.

In step S301, control unit 3 calculates a position deviation corrective lateral force FY1 corresponding to the weighted translation force in accordance with Equation 10, on the basis of position deviation corrective lateral force FY_ERTP obtained in step S101 and priority W1 for position deviation correction that is obtained in step S201.

$$FY1=FY\_ERTP \times W1 \qquad \text{[Equation 10]}$$

Next, in step S302, control unit 3 calculates orientation deviation corrective lateral force FY2 corresponding to the weighted rotational force in accordance with Equation 11, on the basis of orientation deviation corrective lateral force FY_θ obtained in step S102 and priority W2 for orientation deviation correction that is obtained in step S202.

$$FY2=FY\_\theta \times W2 \qquad \text{[Equation 11]}$$

Next, in step S303, control unit 3 calculates a final target lateral force FY in accordance with Equation 12, on the basis of position deviation corrective lateral force FY1 obtained in step S301 and orientation deviation corrective lateral force FY2 obtained in step S302.

$$FY=FY1+FY2 \qquad \text{[Equation 12]}$$

In other words, control unit 3 sets, as final target lateral force FY, a sum obtained by adding position deviation corrective lateral force FY1 (weighted translation force) obtained by multiplying position deviation corrective lateral force FY_ERTP by priority W1 and orientation deviation corrective lateral force FY2 (weighted rotational force) obtained by multiplying orientation deviation corrective lateral force FY_θ by priority W2.

Therefore, for example, when priority W1 is 0.5 and priority W2 is also 0.5, position deviation corrective lateral force FY_ERTP and orientation deviation corrective lateral force FY_θ are reflected in target lateral force FY at the same ratio, whereby orientation deviation correction and position deviation correction are executed at the same level.

On the other hand, as priority W1 becomes greater than 0.5, the ratio of position deviation corrective lateral force FY_ERTP to target lateral force FY increases, and the position deviation correction is executed in preference to the orientation deviation correction. Conversely, as priority W1 decreases to less than 0.5, the ratio of the orientation deviation corrective lateral force FY_θ to target lateral force FY increases, and the orientation deviation correction is executed in preference to the position deviation correction.

Here, since control unit 3 variably sets priorities W1 and W2 according to the specifications relating to traveling of vehicle 10, such as the tendency to understeer and oversteer of vehicle 10, the balance between course traceability and behavior stability can be optimized in accordance with the specifications relating to traveling of vehicle 10.

Hereinafter, the process for setting priorities W1 and W2 on the basis of the specifications relating to traveling of vehicle 10 in step S200 by control unit 3 will be described in detail.

As one aspect of the process for setting priorities W1 and W2, control unit 3 sets priorities W1 and W2 on the basis of the understeer tendency and the oversteer tendency which are specifications relating to traveling of vehicle 10.

Figure 8:
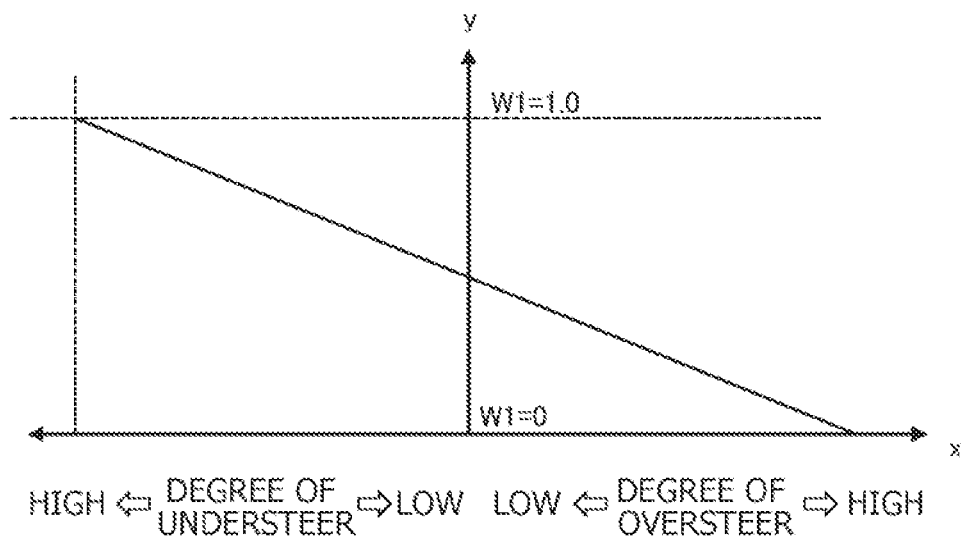
FIG. 8 is a diagram illustrating a correlation of an understeer degree and an oversteer degree with a priority W1.

FIG. 8 illustrates an aspect of a map (conversion table) that control unit 3 refers to in step S201 to obtain priority W1 of position deviation correction on the basis of the understeer tendency and the oversteer tendency.

In the map of FIG. 8, the degree of understeer and the degree of oversteer are set on the x-axis, priority W1 for position deviation correction is set on the y-axis, and priority W1 for position deviation correction is obtained on the basis of the degree of understeer and the degree of oversteer.

In FIG. 8, the origin of the x-axis corresponds to neutral steering, the positive direction from the origin indicates the oversteer tendency, and the negative direction from the origin indicates the understeer tendency.

Also, the farther away from the origin, the higher the degree of oversteer and the degree of understeer are, that is, the stronger the oversteer tendency and the understeer tendency are.

When the neutral steer is in effect, priority W1 is set at 0.5, which is a median value, and as the degree of oversteer increases, priority W1 gradually decreases from 0.5 to reach zero. As the degree of understeer increases, priority W1 gradually increases from 0.5 to reach 1.

Here, when vehicle 10 exhibits the neutral steer tendency, priority W1 and priority W2 are set at 0.5 which is the median value, the position deviation correction and the orientation deviation correction have the same level of priority, and the sum of half of position deviation corrective lateral force FY_ERTP and half of orientation deviation corrective lateral force FY_θ is set as final target lateral force FY.

When vehicle 10 tends to oversteer, the stronger the oversteer tendency is, the smaller priority W1 is and the higher the ratio of orientation deviation corrective lateral force FY_θ is to target lateral force FY.

In other words, as the oversteer tendency becomes stronger, the ratio of orientation deviation corrective lateral force FY2 (weighted rotational force) to position deviation corrective lateral force FY1 (weighted translation force) is increased.

On the other hand, when vehicle 10 exhibits the understeer tendency, the stronger the understeer tendency is, the greater priority W1 is and the higher the ratio of position deviation corrective lateral force FY_ERTP to target lateral force FY.

In other words, as the understeer tendency becomes stronger, the ratio of position deviation corrective lateral force FY1 (weighted translation force) to orientation deviation corrective lateral force FY2 (weighted rotational force) is increased.

Note that the correlation of the degree of understeer and the degree of oversteer with priority W1 is not limited to the characteristics illustrated in FIG. 8; the higher the degree of oversteer, the smaller priority W1 may be than priority W2, and the higher the degree of understeer, the higher priority W1 may tend to be than priority W2.

According to the characteristics of priority W1 for position deviation correction illustrated in FIG. 8, when vehicle 10 tends to oversteer, the higher the degree of oversteer, the lower priority W1 for position deviation correction is maintained by control unit 3, and control unit 3 sets priority W2 for orientation deviation correction relatively high.

Specifically, when vehicle 10 tends to oversteer, the behavior of vehicle 10 tends to be unstable. Therefore, control unit 3 prioritizes the orientation deviation correction over the position deviation correction and stabilizes the unstable behavior of vehicle 10, thereby ensuring the stability of the vehicle behavior.

On the other hand, when vehicle 10 tends to understeer, the higher the degree of understeer, the higher priority W1 for position deviation correction is set by control unit 3, and control unit 3 keeps priority W2 for orientation deviation correction relatively low.

In other words, when vehicle 10 tends to understeer, the stability of the vehicle behavior tends to be relatively high, but the course traceability may be deteriorated.

Therefore, control unit 3 secures the course traceability by prioritizing the position deviation correction over the orientation deviation correction and moving the course of vehicle 10 with respect to the target travel path.

In this manner, control unit 3 sets priorities W1 and W2 in accordance with the tendency to understeer and oversteer, thereby adjusting the balance between the course traceability and the behavior stability to an appropriate balance according to the tendency to understeer and oversteer of vehicle 10.

Also, as another aspect of the process for setting priorities W1 and W2, control unit 3 sets priorities W1 and W2 on the basis of the rate of change in the curvature of the target travel path which is one of the specifications relating to traveling of vehicle 10, that is, the change in a turning radius.

Figure 9:
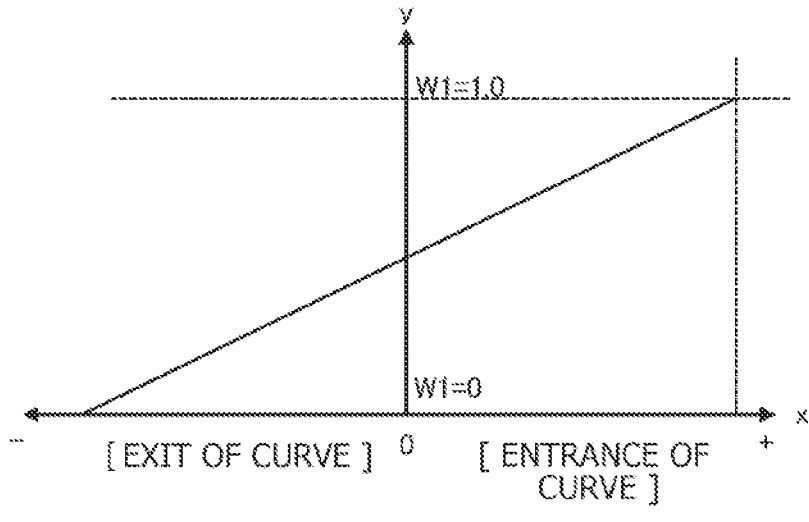
FIG. 9 is a diagram illustrating a correlation between a rate of change in a curvature of a target travel path and priority W1.

FIG. 9 illustrates an aspect of a map (conversion table) that control unit 3 refers to in step S201 to obtain priority W1 for position deviation correction on the basis of the rate of change in the curvature of the target travel path.

In the map of FIG. 9, the rate of change in the curvature of the target travel path is set on the x-axis, priority W1 for position deviation correction is set on the y-axis, and priority W1 for position deviation correction is obtained on the basis of the rate of change in the curvature of the target travel path.

When the rate of change in the curvature is zero, it means that the curvature of the target travel path is constant, and when the rate of change in the curvature takes a positive value, it means that the curvature is increasing and that the curving is sharp. Conversely, when the rate of change in the curvature takes a negative value, it means that the curvature is decreasing and that the curving is mild.

The state in which the curving is sharp is the state in which vehicle 10 is traveling near the entrance of the curve, and the state in which the curving is mild is the state in which vehicle 10 is traveling near the exit of the curve.

In the correlation between the rate of change in the curvature and priority W1 illustrated in FIG. 9, when the rate of change in the curvature is zero and the curvature is constant, priority W1 is set at approximately 0.5, which is the median value. Priority W1 gradually increases from 0.5 to reach 1 as the rate of change in the curvature increases in the positive direction, and priority W1 gradually decreases from 0.5 to reach zero as the rate of change in the curvature increases in the negative direction.

Note that the correlation between the rate of change in the curvature of the target travel path and priority W1 is not limited to the characteristics illustrated in FIG. 9; priority W1 may become greater than priority W2 when the curvature is increasing, and priority W1 may tend to be less than priority W2 when the curvature is decreasing.

According to the characteristics of priority W1 for position deviation correction illustrated in FIG. 9, control unit 3 makes priority W1 for position deviation correction higher than priority W2 for orientation deviation correction when vehicle 10 travels near the entrance of the curve, thereby increasing the course traceability to the target travel path that is set for the curve, and ensuring the travel stability of vehicle 10 traveling on the curve.

In other words, as the rate of change in the curvature increases positively, control unit 3 increases the ratio of position deviation corrective lateral force FY1 (weighted translation force) to orientation deviation corrective lateral force FY2 (weighted rotational force), to improve the course traceability to the target travel path that is a curve.

On the other hand, when vehicle 10 travels near the exit of the curve, control unit 3 makes priority W2 for orientation deviation correction higher than priority W1 for position deviation correction, thereby ensuring the stability of the vehicle behavior in a straight section after the curve.

In other words, as the rate of change in the curvature becomes negatively large, control unit 3 increases the ratio of orientation deviation corrective lateral force FY2

(weighted rotational force) to position deviation corrective lateral force FY1 (weighted translation force), to ensure the stability of the vehicle behavior after the curve.

In this manner, control unit 3 sets priorities W1 and W2 in accordance with the rate of change in the curvature of the target travel path, thereby adjusting the balance between the course traceability and the behavior stability to an appropriate balance according to the changes in the curvature of the target travel path.

In addition, as another aspect of the process for setting priorities W1 and W2, control unit 3 sets priorities W1 and W2 on the basis of the road width which is one of the specifications relating to travel of vehicle 10, that is, more specifically, the road width including the target travel path in which vehicle 10 travels.

Figure 10:
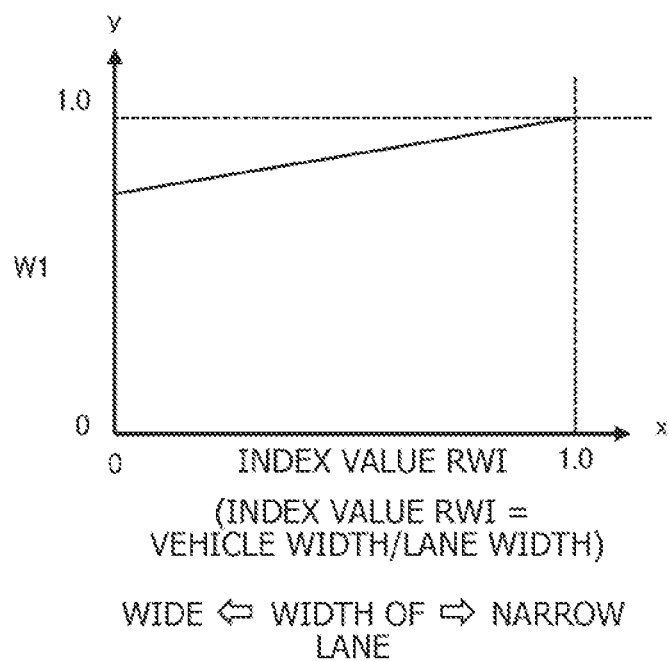
FIG. 10 is a diagram illustrating a correlation between an index value (index value=vehicle width/lane width) and priority W1.

FIG. 10 illustrates an aspect of a map (conversion table) that control unit 3 refers to in step S201 to obtain priority W1 for position deviation correction on the basis of the road width.

In the map of FIG. 10, the value obtained by dividing the vehicle width by the lane width is taken as a road width index value RWI (index value RWI>0), the index value RWI being taken as the x-axis, and priority W1 for position deviation correction is taken as the y-axis and obtained from index value RWI related to the road width.

Here, since the index value RWI is obtained as index value RWI=vehicle width/lane width, index value RWI (0<RWI≤1) becomes smaller as the lane width becomes wider than the vehicle width. Thus, the index value RWI indicates a margin ratio of the lane width to the vehicle width.

That is, the smaller index value RWI is, the wider the lane width and the higher the margin ratio of the lane width with respect to the vehicle width, and conversely, the larger the index value RWI is, the narrower the lane width and the lower the margin ratio of the lane width with respect to the vehicle width.

A state in which index value RWI is small, that is, a state in which the margin ratio is high, is a state in which traveling within the lane width is easy and the risk of collision with the surrounding environment is small. A state in which index value RWI is large, that is, a state in which the margin ratio is low, is a state in which the risk of going off course or collision increases.

In FIG. 10, when the vehicle width and the lane width match and index value RWI is 1, priority W1 (W1>0) for position deviation correction is set at 1, and as index value RWI becomes smaller than 1, that is, as the lane width increases, priority W1 is gradually reduced.

Note that the correlation between index value RWI and priority W1 is not limited to the characteristics illustrated in FIG. 10, but the characteristic may be such that priority W1 is changed to a higher value as the lane width becomes narrower than the vehicle width.

Furthermore, since the vehicle width is fixed for each vehicle 10, the map for obtaining priority W1 is set as the map for obtaining priority W1 from the road width or the lane width, and the characteristics of the relevant map can be changed in accordance with the vehicle width of vehicle 10.

According to the characteristics of priority W1 for position deviation correction illustrated in FIG. 10, control unit 3 sets priority W1 for position deviation correction higher as the road width becomes narrower and index value RWI becomes closer to 1, and keeps priority W2 for orientation correction relatively low.

A state in which index value RWI is close to 1 means that the road width is narrower than the width of the vehicle itself and that the risk of course departure or collision increases. Therefore, control unit 3 sets priority W1 for position deviation correction high, thereby improving course traceability and ensuring travel stability.

In other words, as the margin in the width direction of the vehicle with respect to the road width decreases, control unit 3 increases the ratio of position deviation corrective lateral force FY1 (weighted translation force) to the orientation deviation corrective lateral force FY2 (weighted rotational force), to improve the course traceability.

Therefore, control unit 3 can adjust the balance between the course traceability and the behavior stability to an appropriate balance according to the road width by setting priorities W1 and W2 according to the road width.

Also, as another aspect of the process for setting priorities W1 and W2, control unit 3 sets priorities W1 and W2 on the basis of deceleration DE which is one of the specifications relating to traveling of vehicle 10.

Figure 11:
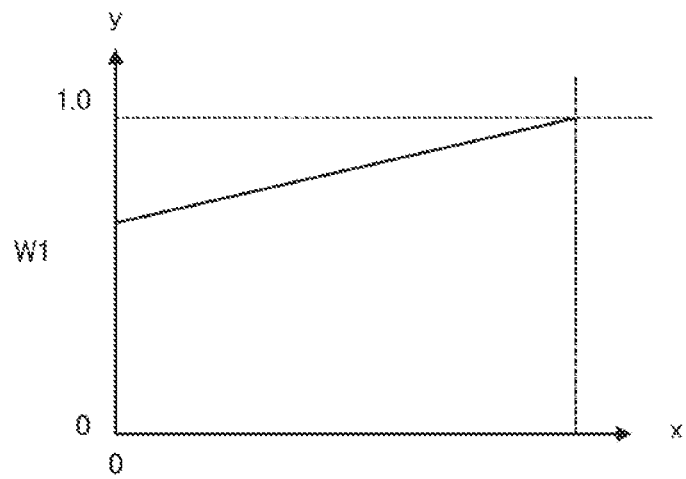
FIG. 11 is a diagram illustrating a correlation between deceleration of the vehicle and priority W1.

FIG. 11 illustrates an aspect of a map (conversion table) that control unit 3 refers to in step S201 to obtain priority W1 for position deviation correction on the basis of deceleration DE of vehicle 10.

In the map of FIG. 11, deceleration DE is set on the x-axis, priority W1 for position deviation correction is set on the y-axis, and priority W1 (W1>0) for position deviation correction is obtained from deceleration DE.

Note that deceleration DE of vehicle 10 is a negative acceleration, which is the amount of decrease in the vehicle speed per unit time.

Here, with the origin of the x-axis representing zero deceleration DE, the positive direction from the origin means a deceleration operation state of vehicle 10, wherein deceleration DE (decrease in vehicle speed per unit time) increases as the distance from the origin increases in the positive direction.

Then, in the characteristics illustrated in FIG. 11, from priority W1 (0<W1<1) when deceleration DE is zero, priority W1 gradually increases to reach 1 as deceleration DE increases.

In other words, as deceleration DE of vehicle 10 increases, the ratio of the position deviation corrective lateral force FY1 (weighted translation force) to the orientation deviation corrective lateral force FY2 (weighted rotational force) is increased, to improve the course traceability.

Note that the correlation between deceleration DE and priority W1 is not limited to the characteristics illustrated in FIG. 11, but the characteristics may be such that priority W1 is changed to a higher value as deceleration DE increases, that is, at the time of sudden deceleration.

According to the characteristics of priority W1 for position deviation correction illustrated in FIG. 11, control unit 3 enhances the course traceability by setting priority W1 for the position deviation correction high when the urgency is high, such as when, for example, sudden braking is implemented to avoid danger, and thereby improves the safety of vehicle 10.

Therefore, control unit 3 can adjust the balance between the course traceability and the behavior stability to an appropriate balance according to deceleration DE by setting priorities W1 and W2 in accordance with deceleration DE.

Incidentally, in the process for calculating the target lateral force, control unit 3 can obtain the lateral displacement amount and the orientation displacement amount in consideration of the lateral displacement amount and the orientation displacement amount caused by the centripetal force according to the curvature of the target travel path at the target movement point. An embodiment having such a configuration will be described hereinafter.

Figure 12:
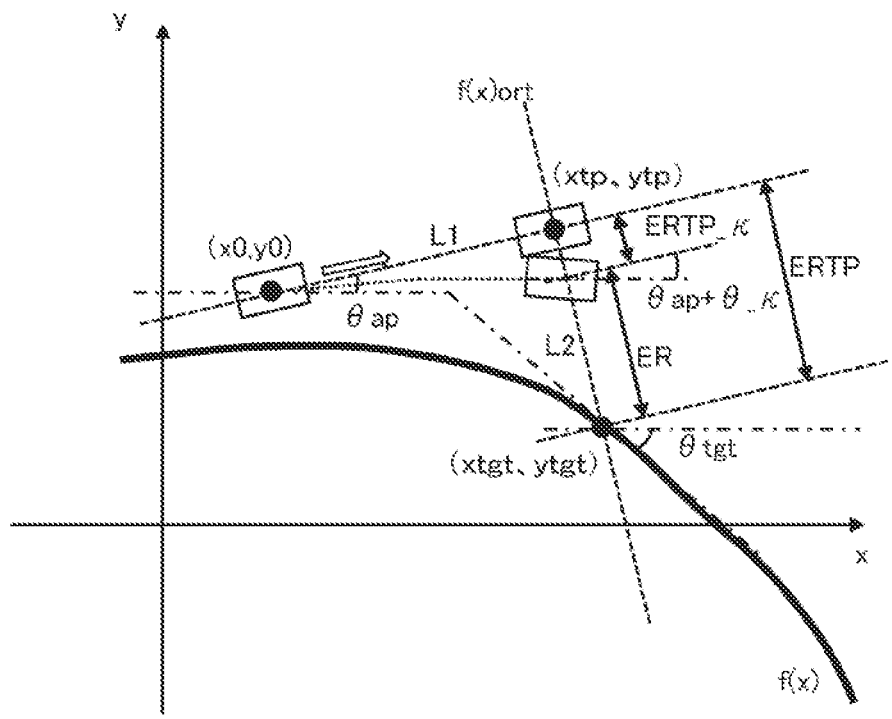
FIG. 12 is a diagram illustrating a lateral displacement amount and an orientation displacement amount caused by a centripetal force, in the horizontal coordinate system.

FIG. 12 is a diagram illustrating the lateral displacement amount and the orientation displacement amount caused by the centripetal force according to the curvature of the target travel path at the target movement point in the horizontal coordinate system.

Figure 13:
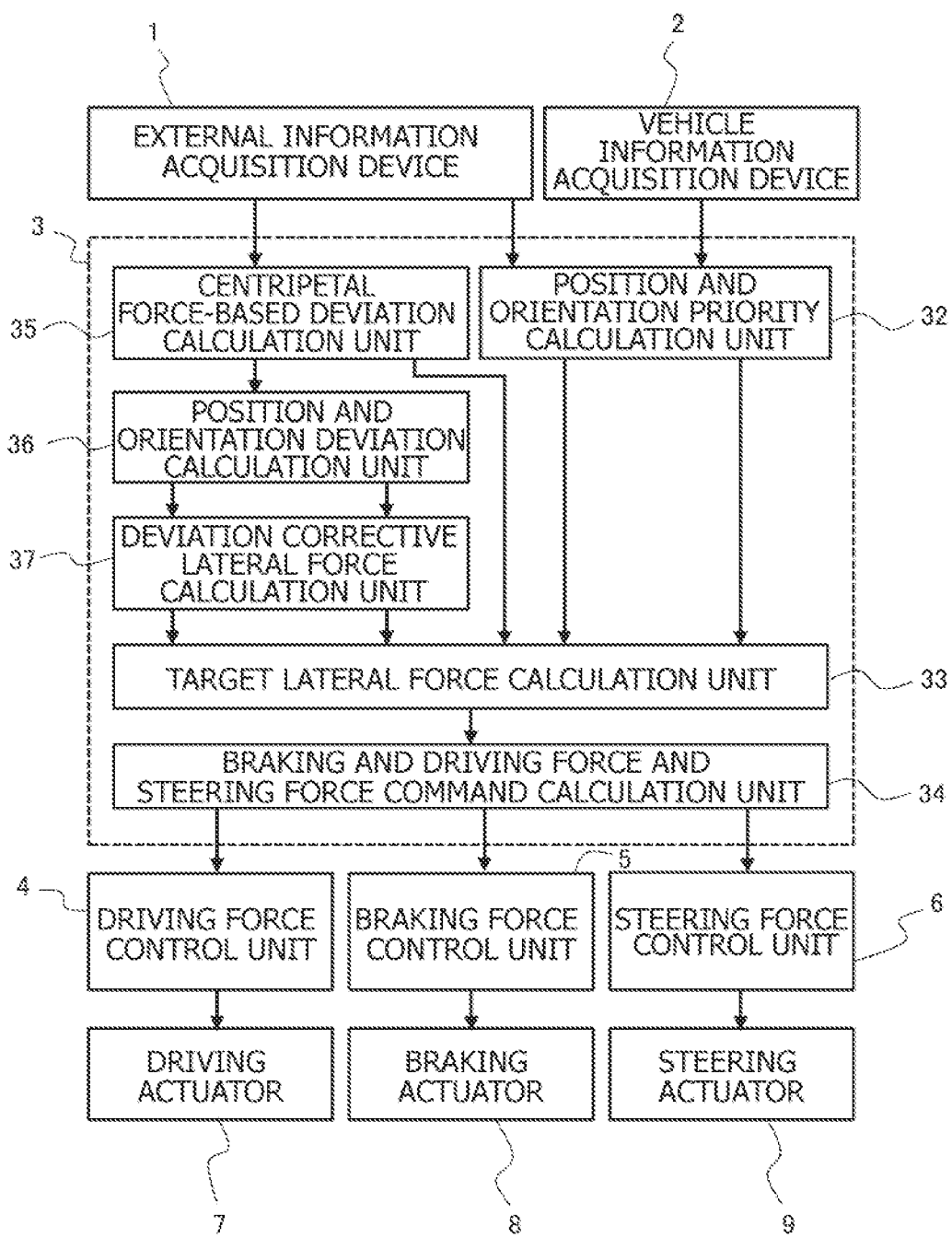
FIG. 13 is a functional block diagram of the control unit as the vehicle motion control device.

FIG. 13 is a functional block diagram of control unit 3 that obtains the lateral displacement amount and the orientation displacement amount in consideration of the centripetal force according to the curvature of the target travel path at the target movement point.

In FIG. 13, control unit 3 functioning as a controller includes position and orientation priority calculation unit 32, target lateral force calculation unit 33, braking and driving forces and steering force command calculation unit 34, a centripetal force-based deviation calculation unit 35, a position and orientation deviation calculation unit 36, and a deviation corrective lateral force calculation unit 37.

Since position and orientation priority calculation unit 32, target lateral force calculation unit 33, and braking and driving force and steering force command calculation unit 34 that are illustrated in FIG. 13 have the same functions as those illustrated in the functional block diagram of FIG. 2, detailed descriptions thereof are omitted accordingly.

Centripetal force-based deviation calculation unit 35 calculates a centripetal force FY_κ according to a curvature κ of the target travel path at the target movement point ($x_{tgt}$, $y_{tgt}$).

Centripetal force-based deviation calculation unit 35 also calculates a lateral displacement amount ERTP_κ, which is a lateral movement component of vehicle 10 with respect to the predicted movement point generated based on the centripetal force FY_κ, and an orientation displacement amount θ_κ, which is a displacement amount of vehicle 10 in the yaw direction with respect to the predicted movement point generated based on the centripetal force FY_κ.

Position and orientation deviation calculation unit 36 obtains lateral deviation amount ER at the target movement point in consideration of lateral displacement amount ERTP_κ based on centripetal force FY_κ, and obtains orientation displacement amount θmp at the target movement point in consideration of the orientation displacement amount θ_κ based on centripetal force FY_κ.

Deviation corrective lateral force calculation unit 37 obtains position deviation corrective lateral force FY_ER on the basis of lateral displacement amount ER, and obtains orientation deviation corrective lateral force FY_θmp on the basis of orientation displacement amount θmp.

As described above, position and orientation priority calculation unit 32 calculates priorities W1 and W2 on the basis of the specifications relating to traveling of vehicle 10, such as the tendency to understeer and oversteer.

Target lateral force calculation unit 33 weights position deviation corrective lateral force FY_ER and orientation deviation corrective lateral force FY_θmp according to priorities W1 and W2, respectively, and calculates position deviation corrective lateral force FY1 (weighted translation force) and orientation deviation corrective lateral force FY2 (weighted rotational force).

Moreover, target lateral force calculation unit 33 adds up position deviation corrective lateral force FY1, orientation deviation corrective lateral force FY2, and centripetal force FY_κ corresponding to curvature κ at the target movement point, to obtain final target lateral force FY.

Braking and driving force and steering force command calculation unit 34 inputs target lateral force FY obtained by target lateral force calculation unit 33, freely distributes the input target lateral force FY to the driving force, braking force, and steering force, obtains a target driving force, a target braking force, and a target steering force, which are control commands for achieving target lateral force FY, and outputs control commands corresponding to respective targets to driving actuator 7, braking actuator 8, and steering actuator 9.

Figure 14:
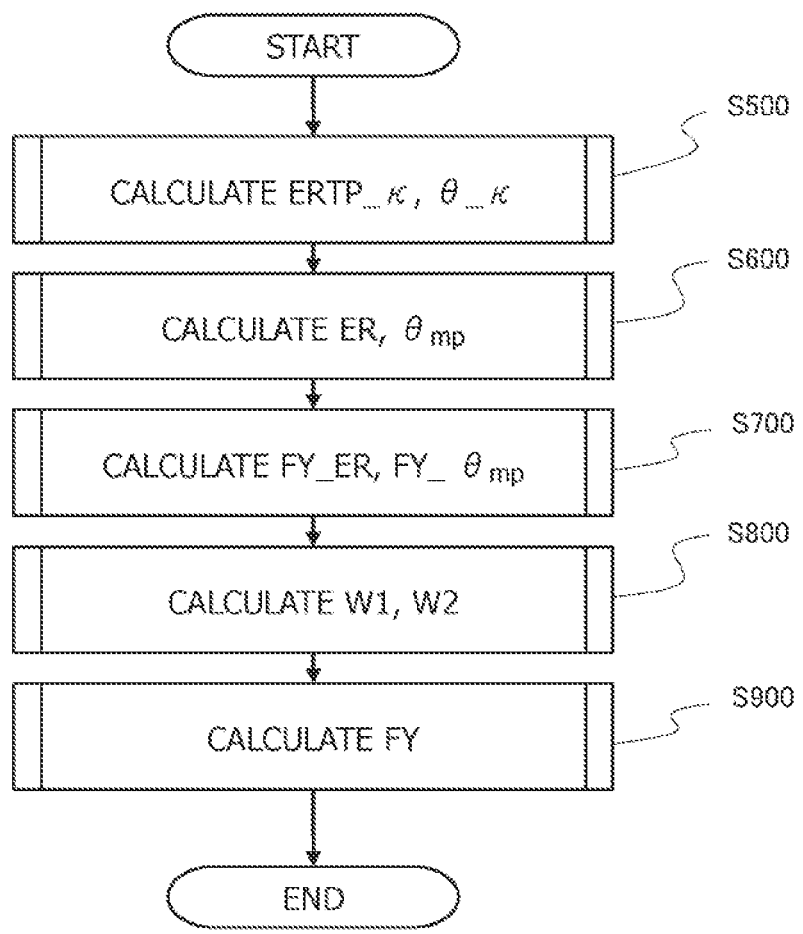
FIG. 14 is a flowchart illustrating the main routine of the process for calculating the target lateral force.

FIG. 14 is a flowchart illustrating a main routine for the process for calculating target lateral force FY by control unit 3.

In step S500 (centripetal force-based deviation calculation unit 35), control unit 3 calculates lateral displacement amount ERTP_κ and orientation displacement amount θ_κ caused by centripetal force FY_κ.

Next, in step S600 (position/orientation deviation calculation unit 36), control unit 3 obtains lateral displacement amount ER and orientation displacement amount θmp in consideration of lateral displacement amount ERTP_κ and orientation displacement amount θ_κ.

Then, in step S700 (deviation corrective lateral force calculation unit 37), control unit 3 obtains position deviation corrective lateral force FY_ER, which is a translation force for causing the position of vehicle 10 to trace the target travel path, on the basis of lateral displacement amount ER, and obtains orientation deviation corrective lateral force FY_θmp, which is a rotational force for correcting the orientation of vehicle 10 with respect to the target travel path, on the basis of orientation displacement amount θmp.

In the next step S800 (position and orientation priority calculation unit 32), control unit 3 sets priority W1 of position deviation corrective lateral force FY_ER and priority W2 of orientation deviation corrective the lateral force FY_θmp, on the basis of the specifications relating to traveling of vehicle 10, such as the tendency to understeer and oversteer of vehicle 10.

Then, in step S900 (target lateral force calculation unit 33), control unit 3 obtains target lateral force FY by adding up position deviation corrective lateral force FY1, which is the result of weighting position deviation corrective lateral force FY_ER with priority W1, orientation deviation corrective lateral force FY2, which is the result of weighting orientation deviation corrective lateral force FY_θmp with priority W2, and centripetal force FY_κ corresponding to curvature κ at the target movement point.

Figure 15:
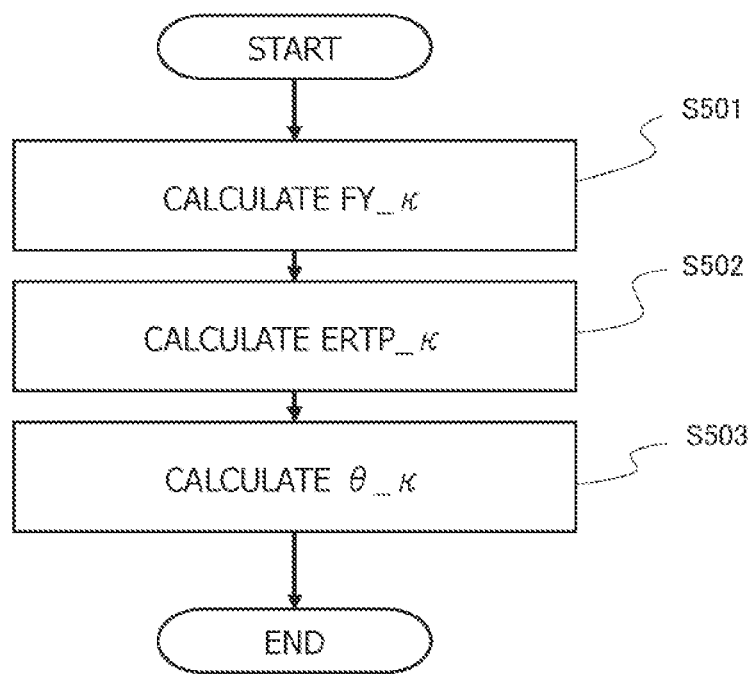
FIG. 15 is a flowchart illustrating a process for calculating the lateral displacement amount and the orientation displacement amount caused by the centripetal force.

Here, the details of the process in step S500 performed by control unit 3 will be described in detail with reference to the flowchart of FIG. 15.

In step S501, control unit 3 calculates centripetal force FY_κ according to Equation 13, on the basis of curvature κ of the target travel path at the target movement point.

$$FY_{\kappa} = m \cdot \kappa \cdot V^2 \quad \text{[Equation 13]}$$

Specifically, control unit 3 obtains centripetal force FY_κ on the basis of a physical quantity related to curvature κ at the target movement point and a physical quantity related to velocity V of vehicle 10.

Next, in step S502, control unit 3 calculates lateral displacement amount ERTP_κ, which is a lateral movement component of vehicle 10 with respect to the predicted movement point generated by centripetal force FY_κ, in accordance with Equation 14.

$$ERTP_{\kappa} = \tfrac{1}{2} \cdot \kappa \cdot V^2 \cdot TP^2 \quad \text{[Equation 14]}$$

Next, in step S503, control unit 3 calculates orientation deviation amount θ_κ, which is a change component of vehicle 10 in the yaw direction with respect to the predicted movement point generated based on centripetal force FY_κ, in accordance with Equation 15.

$$\theta\_\kappa = \kappa \cdot V \cdot TP \quad \text{[Equation 15]}$$

Figure 16:
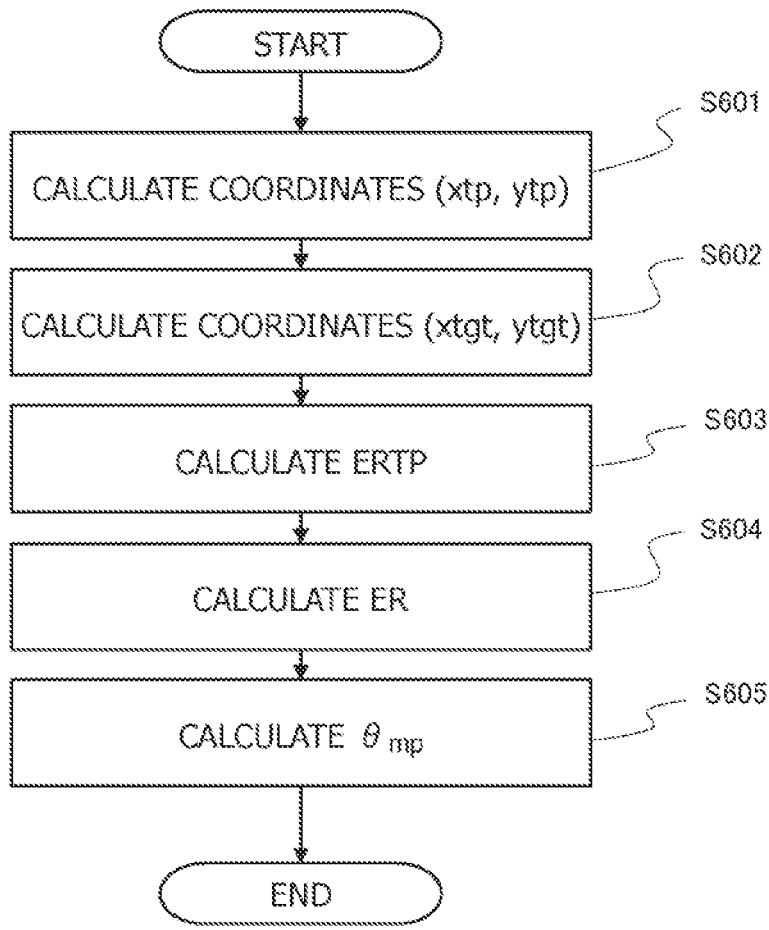
FIG. 16 is a flowchart illustrating a process for calculating a lateral displacement amount and an orientation displacement amount in consideration of the lateral displacement amount and the orientation displacement amount caused by the centripetal force.

Next, the details of the process in step S600 performed by control unit 3 will be described in detail with reference to the flowchart of FIG. 16.

In step S601, in accordance with Equation 2 described above, control unit 3 calculates the coordinates $(x_{tp}, y_{tp})$ of the predicted movement point after time period TP on the basis of the coordinates (x0, y0) of the current position of vehicle 10 and the current orientation θap of vehicle 10.

Next, in step S602, control unit 3 obtains a function $f(x)_{ort}$ that passes through the coordinates $(x_{tp}, y_{tp})$ of the predicted movement point and is orthogonal to the line connecting the coordinates (x0, y0) of the current position and the coordinates $(x_{tp}, y_{tp})$ of the predicted movement point, in accordance with Equation 3 described above.

In step S602, control unit 3 also calculates the coordinates $(x_{tgt}, y_{tgt})$ of the target movement point from the function $f(x)_{ort}$ passing through the coordinates $(x_{tp}, y_{tp})$ of the predicted movement point and the function f(x) representing the target travel path (target travel track), in accordance with Equation 4 described above.

In step S603, control unit 3 calculates lateral displacement amount ERTP, which is the amount of lateral displacement of vehicle 10 with respect to the target movement point, from the coordinates $(x_{tp}, y_{tp})$ of the predicted movement point and the coordinates $(x_{tgt}, y_{tgt})$ of the target movement point, in accordance with Equation 5 described above.

Next, in step S604, control unit 3 calculates final lateral displacement amount ER in accordance with Equation 16, on the basis of lateral displacement amount ERTP_κ which is a first lateral displacement amount obtained in step S502, and lateral displacement amount ERTP which is a second lateral displacement amount obtained in step S603 (see FIG. 12).

$$ER = ERTP - ERTP\_\kappa \quad \text{[Equation 16]}$$

Also, in step S605, control unit 3 calculates final orientation displacement amount θmp in accordance with Equation 17, on the basis of orientation θap of vehicle 10 at the current point, orientation θtgt of vehicle 10 at the target movement point, and orientation displacement amount θ_k obtained in step S503 (see FIG. 12).

$$\theta_{mp} = \theta_{tgt} - \theta_{ap} - \theta\_\kappa \quad \text{[Equation 17]}$$

In other words, control unit 3 calculates final orientation displacement amount θmp in accordance with Equation 17, on the basis of orientation displacement amount θ_k as a first orientation displacement amount, and orientation displacement amount θde (θde=θtgt−θap) as a second orientation displacement amount.

Figure 17:
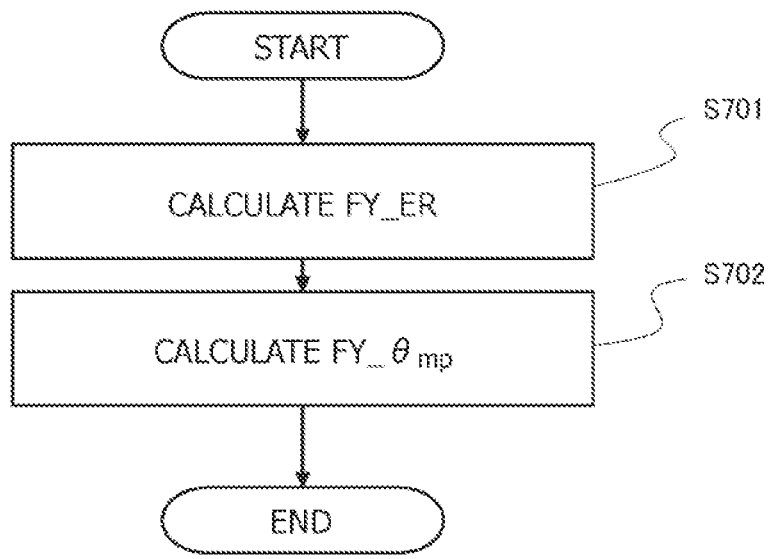
FIG. 17 is a flowchart illustrating a process for calculating the position or orientation deviation corrective lateral force, or both.

Next, the details of the process in step S700 performed by control unit 3 will be described in detail with reference to the flowchart of FIG. 17.

First, in step S701, control unit 3 calculates position deviation corrective lateral force FY_ER in accordance with Equation 18, on the basis of lateral displacement amount ER obtained in step S604.

$$FY\_ER = m \cdot \frac{2}{TP^2} \cdot ER \quad \text{[Equation 18]}$$

Next, in step S702, control unit 3 calculates orientation deviation corrective lateral force FY_θmp in accordance with Equation 19, on the basis of orientation displacement amount θmp obtained in step S605.

$$FY\_\theta_{mp} = m \cdot \frac{\theta_{mp}}{TP} \cdot V \quad \text{[Equation 19]}$$

Figure 18:
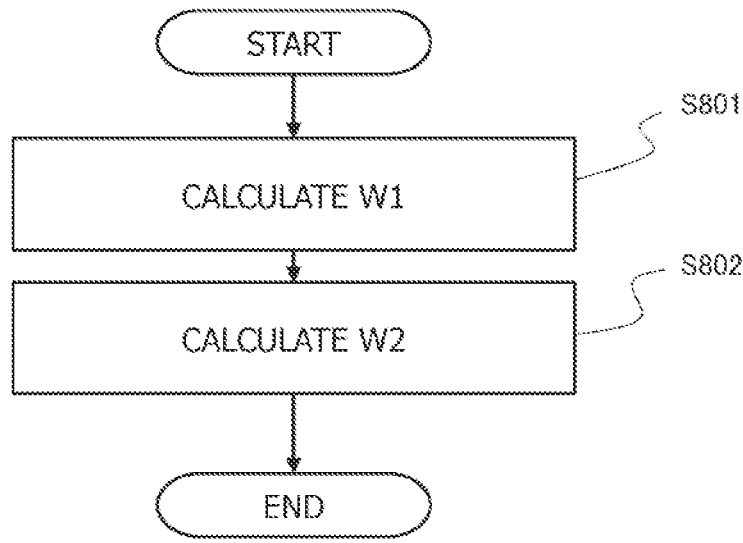
FIG. 18 is a flowchart illustrating a process for calculating a priority.

Next, the process for setting priorities W1 and W2 in step S800 performed by control unit 3 will be described with reference to the flowchart of FIG. 18.

First, control unit 3 obtains priority W1 for position deviation correction (weighting variable for position deviation correction) on the basis of the specifications relating to traveling of vehicle 10, such as the tendency to understeer and oversteer, the rate of change in the curvature of the target travel path, the road width, and the deceleration of vehicle 10.

Note that, in step S801, control unit 3 calculates priority W1 on the basis of the specifications relating to traveling of vehicle 10, as with step S201 described above.

Specifically, the characteristics of priority W1 with respect to the tendency to understeer and oversteer, the rate of change in the curvature of the target travel path, the road width, and the deceleration of vehicle 10 are as illustrated in FIGS. 8 to 11.

Next, in step S802, control unit 3 obtains priority W2 for orientation deviation correction (weighting variable for orientation deviation correction) on the basis of priority W1 for position deviation correction obtained in step S801.

In step S802, control unit 3 obtains priority W2 for orientation deviation correction in accordance with Equation 9, as with step S202 described above.

Figure 19:
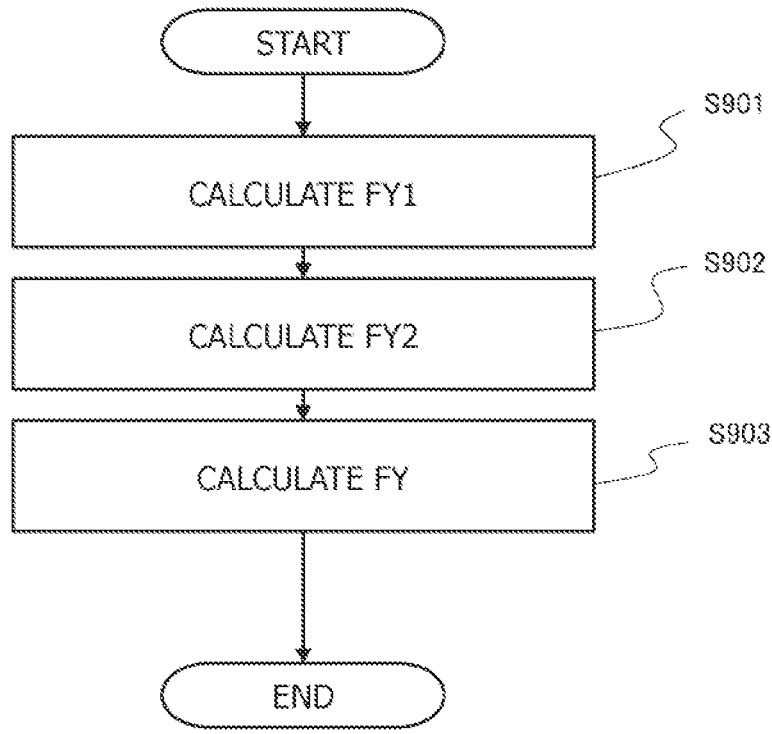
FIG. 19 is a flowchart illustrating a process for calculating the target lateral force.

Next, the details of the process in step S900 performed by control unit 3 will be described in detail with reference to the flowchart of FIG. 19.

In step S901, control unit 3 calculates position deviation corrective lateral force FY1 in accordance with Equation 20, on the basis of priority W1 for position deviation correction obtained in step S801 and position deviation corrective lateral force FY_ER obtained in step S701.

In other words, control unit 3 weights position deviation corrective lateral force FY_ER based on priority W1, to obtain position deviation corrective lateral force FY1 corresponding to the weighted translation force.

$$FY1 = FY\_ER \times W1 \quad \text{[Equation 20]}$$

In step S902, control unit 3 calculates orientation deviation corrective lateral force FY2 in accordance with Equation 21, on the basis of priority W2 orientation deviation correction obtained in step S802 and orientation deviation corrective lateral force FY_θmp obtained in step S702.

In other words, control unit 3 weights orientation deviation corrective lateral force FY_θmp based on priority W2, to obtain orientation deviation corrective lateral force FY2 corresponding to the weighted rotational force.

$$FY2 = FY\_\theta_{mp} \times W2 \quad \text{[Equation 21]}$$

In step S903, control unit 3 then calculates final target lateral force FY in accordance with Equation 22, on the basis of position deviation corrective lateral force FY1 obtained in step S901, orientation deviation corrective lateral force FY2 obtained in step S902, and centripetal force FY_κ corresponding to the curvature κ at the target movement point that is obtained in step S501.

$$FY = FY1 + FY2 + FY\_\kappa \quad \text{[Equation 22]}$$

According to the embodiments described above, since control unit 3 obtains the position deviation corrective lateral force and the orientation deviation corrective lateral force in consideration of the lateral displacement amount and the orientation displacement amount caused by centripetal force FY_κ, control unit 3 can accurately obtain the lateral force (translation force) for causing vehicle 10 to trace the target travel path and the lateral force (rotational force) for correcting the orientation of vehicle 10 with respect to the target travel path.

In addition, control unit 3 sets priorities W1 and W2 on the basis of the tendency to understeer and oversteer, the rate of change in the curvature of the target travel path, the road width, and the deceleration, thereby adjusting the balance between the course traceability (position deviation correction) and the behavior stability (orientation deviation correction) to an appropriate balance according to the specifications (travel conditions) relating to traveling of vehicle 10.

The technical ideas described in the foregoing embodiments can be used in combination as appropriate, as long as there is no conflict.

Moreover, although the details of the present invention have been specifically described with reference to the preferred embodiments, it is obvious that those skilled in the art can adopt various modifications on the basis of the basic technical ideas and teachings of the present invention.

In the foregoing embodiments, the specifications relating to traveling of vehicle 10 that are used to set priorities W1 and W2 are the understeer tendency, and the oversteer tendency, the rate of change in the curvature of the target travel path, the road width, and the deceleration, but are not limited thereto.

For example, control unit 3 can set priorities W1 and W2 on the basis of specifications relating to traveling of vehicle 10 that affect the course traceability and behavior stability of vehicle 10, the specifications including a friction coefficient of a road surface, the strength of the crosswind, a movable load, a degree of tire wear, a tire pressure, a road surface gradient, and a lateral inclination angle of the road surface (i.e., turning inclination angle).

Control unit 3 can also set priorities W1 and W2 by combining a plurality of these specifications relating to traveling of vehicle 10 that are described above.

Also, when setting priorities W1 and W2 by using a plurality of specifications relating to traveling of vehicle 10, control unit 3 can obtain final priorities W1 and W2 by weighting priorities W1 and W2 obtained for each element.

Furthermore, control unit 3 can change priorities W1 and W2 when vehicle 10 tends to either understeer or oversteer, such as when, for example, vehicle 10 tends to oversteer.

In addition, control unit 3 can calculate priority W2 for orientation deviation correction according to the specifications relating to traveling of vehicle 10, and can obtain priority W1 for position deviation correction from the calculated priority W2 for orientation deviation correction. Control unit 3 can also use the map in which priority W1 and priority W2 can be obtained together according to the specifications relating to traveling of vehicle 10.

Also, in the embodiments described above, as illustrated in Equation 8, the sum of priority W1 for position deviation correction and priority W2 for orientation deviation correction is 1, but the sum is not limited to 1 and can be any value.

For example, control unit 3 can change the sum in accordance with the level of automatic driving, such as by setting the sum lower when a driving support control is executed, compared to when vehicle 10 runs automatically.

REFERENCE SYMBOL LIST

1 External information acquisition device (external recognition unit)
2 Vehicle information acquisition device
3 Control unit (vehicle motion control device, controller)
4 Driving force control unit
5 Braking force control unit
6 Steering force control unit
7 Driving actuator
8 Braking actuator
9 Steering actuator
10 Vehicle
11 Vehicle motion control system

The invention claimed is:

1. A vehicle motion control device comprising a control unit for controlling a braking actuator, a driving actuator, and a steering actuator that are provided in a vehicle,
wherein the control unit is configured to:
acquire a target travel path on which the vehicle travels, the target travel path being obtained on the basis of external information acquired by an external recognition unit,
obtain a centripetal force on the basis of a physical quantity related to a curvature at the target movement point and a physical quantity related to a velocity of the vehicle,
obtain the lateral displacement amount, which is an amount of displacement of the vehicle in a lateral direction with respect to a target movement point on the target travel path, on the basis of a first lateral displacement amount which is a movement component of the vehicle in the lateral direction with respect to the target movement point that is generated based on the centripetal force, and a second lateral displacement amount which is the amount of displacement of the vehicle in the lateral direction with respect to the target movement point,
obtain a translation force for causing a position of the vehicle to trace the target travel path, on the basis of a lateral displacement amount,
obtain an orientation displacement amount, which is an amount of displacement of the vehicle in a yaw direction with respect to the target movement point, on the basis of a first orientation displacement amount which is a change component of the vehicle in the yaw direction with respect to the target movement point that is generated based on the centripetal force, and a second orientation displacement amount which is the amount of displacement in the yaw direction with respect to the target movement point,
obtain a rotational force for correcting an orientation of the vehicle with respect to the target travel path, on the basis of the orientation displacement amount,
obtain a weighted translation force and a weighted rotational force after weighting the translation force and the rotational force, on the basis of specifications relating to acquired traveling of the vehicle, and
output a control command for achieving a target lateral force obtained by adding up the weighted translation force and the weighted rotational force to the braking actuator, the driving actuator, and the steering actuator.

2. The vehicle motion control device according to claim 1, wherein the control unit obtains the target lateral force by adding up the centripetal force to the weighted translation force and the weighted rotational force, and outputs the control command for achieving the target lateral force to the braking actuator, the driving actuator, and the steering actuator.

3. A vehicle motion control device comprising a control unit for controlling a braking actuator, a driving actuator, and a steering actuator that are provided in a vehicle, wherein the control unit is configured to:

acquire a target travel path on which the vehicle travels, the target travel path being obtained on the basis of external information acquired by an external recognition unit, obtain a translation force for causing a position of the vehicle to trace the target travel path, on the basis of a lateral displacement amount, which is an amount of displacement of the vehicle in a lateral direction with respect to a target movement point on the target travel path, obtain a rotational force for correcting an orientation of the vehicle with respect to the target travel path, on the basis of an orientation displacement amount, which is an amount of displacement of the vehicle in a yaw direction with respect to the target movement point, obtain a weighted translation force and a weighted rotational force after weighting the translation force and the rotational force, on the basis of specifications relating to acquired traveling of the vehicle, and output a control command for achieving a target lateral force obtained by adding up the weighted translation force and the weighted rotational force to the braking actuator, the driving actuator, and the steering actuator, wherein the specifications relating to traveling of the vehicle include an understeer tendency and an oversteer tendency of the vehicle, wherein the control unit increases a ratio of the weighted translation force to the weighted rotational force as the understeer tendency becomes high, and wherein the control unit increases a ratio of the weighted rotational force to the weighted translation force as the oversteer tendency becomes high.

4. A vehicle motion control device comprising a control unit for controlling a braking actuator, a driving actuator, and a steering actuator that are provided in a vehicle, wherein the control unit is configured to:

acquire a target travel path on which the vehicle travels, the target travel path being obtained on the basis of external information acquired by an external recognition unit, obtain a translation force for causing a position of the vehicle to trace the target travel path, on the basis of a lateral displacement amount, which is an amount of displacement of the vehicle in a lateral direction with respect to a target movement point on the target travel path, obtain a rotational force for correcting an orientation of the vehicle with respect to the target travel path, on the basis of an orientation displacement amount, which is an amount of displacement of the vehicle in a yaw direction with respect to the target movement point, obtain a weighted translation force and a weighted rotational force after weighting the translation force and the rotational force, on the basis of specifications relating to acquired traveling of the vehicle, and output a control command for achieving a target lateral force obtained by adding up the weighted translation force and the weighted rotational force to the braking actuator, the driving actuator, and the steering actuator, wherein the specifications relating to traveling of the vehicle include a rate of change in a curvature of the target travel path, wherein the control unit increases the ratio of the weighted translation force to the weighted rotational force as the rate of change in the curvature increases positively, and wherein the control unit increases the ratio of the weighted rotational force to the weighted translation force as the rate of change in the curvature increases negatively.

5. A vehicle motion control device comprising a control unit for controlling a braking actuator, a driving actuator, and a steering actuator that are provided in a vehicle, wherein the control unit acquires a target travel path on which the vehicle travels, the target travel path being obtained on the basis of external information acquired by an external recognition unit, the control unit obtains a translation force for causing a position of the vehicle to trace the target travel path, on the basis of a lateral displacement amount, which is an amount of displacement of the vehicle in a lateral direction with respect to a target movement point on the target travel path, the control unit obtains a rotational force for correcting an orientation of the vehicle with respect to the target travel path, on the basis of an orientation displacement amount, which is an amount of displacement of the vehicle in a yaw direction with respect to the target movement point, the control unit obtains a weighted translation force and a weighted rotational force after weighting the translation force and the rotational force, on the basis of specifications relating to traveling of the vehicle that include a road width including acquired the target travel path on which the vehicle travels, and the control unit outputs a control command for achieving a target lateral force obtained by adding up the weighted translation force and the weighted rotational force to the braking actuator, the driving actuator, and the steering actuator.

6. The vehicle motion control device according to claim 5, wherein the control unit increases the ratio of the weighted translation force to the weighted rotational force as a margin ratio of the vehicle in a width direction with respect to the road width becomes small.

7. A vehicle motion control method for controlling a braking actuator, a driving actuator, and a steering actuator that are provided in a vehicle, the vehicle motion control method comprising the steps of:

acquiring a target travel path on which the vehicle travels, the target travel path being obtained on the basis of external information acquired by an external recognition unit;

obtaining a centripetal force on the basis of a physical quantity related to a curvature at the target movement point and a physical quantity related to a velocity of the vehicle, obtaining a lateral displacement amount, which is an amount of displacement of the vehicle in a lateral direction with respect to a target movement point on the target travel path, on the basis of a first lateral displacement amount which is a movement component of the vehicle in the lateral direction with respect to the target movement point that is generated based on the centripetal force, and a second lateral displacement amount which is the amount of displacement of the vehicle in the lateral direction with respect to the target movement point;

obtaining a translation force for causing a position of the vehicle to trace the target travel path, on the basis of the lateral displacement amount;

obtaining an orientation displacement amount, which is an amount of displacement of the vehicle in a yaw direction with respect to the target movement point, on the basis of a first orientation displacement amount which is a change component of the vehicle in the yaw direction with respect to the target movement point that is generated based on the centripetal force, and a second orientation displacement amount which is the amount of displacement in the yaw direction with respect to the target movement point;

obtaining a rotational force for correcting an orientation of the vehicle with respect to the target travel path, on the basis of the orientation displacement amount;

obtaining a weighted translation force and a weighted rotational force after weighting the translation force and the rotational force, on the basis of specifications relating to acquired traveling of the vehicle; and outputting a control command for achieving a target lateral force obtained by adding up the weighted translation force and the weighted rotational force to the braking actuator, the driving actuator, and the steering actuator.

8. A vehicle motion control system, comprising:

an external recognition unit that acquires external information of a vehicle;

a control unit that is configured to:
  acquire a target travel path on which the vehicle travels, the target travel path being obtained on the basis of the external information acquired by the external recognition unit;
    obtain a centripetal force on the basis of a physical quantity related to a curvature at the target movement point and a physical quantity related to a velocity of the vehicle;
    obtain the lateral displacement amount, which is an amount of displacement of the vehicle in a lateral direction with respect to a target movement point on the target travel path, on the basis of a first lateral displacement amount which is a movement component of the vehicle in the lateral direction with respect to the target movement point that is generated based on the centripetal force, and a second lateral displacement amount which is the amount of displacement of the vehicle in the lateral direction with respect to the target movement point;
    obtain a translation force for causing a position of the vehicle to trace the target travel path, on the basis of the lateral displacement amount;
    obtain an orientation displacement amount, which is an amount of displacement of the vehicle in a yaw direction with respect to the target movement point, on the basis of a first orientation displacement amount which is a change component of the vehicle in the yaw direction with respect to the target movement point that is generated based on the centripetal force, and a second orientation displacement amount which is the amount of displacement in the yaw direction with respect to the target movement point,
    obtain a rotational force for correcting an orientation of the vehicle with respect to the target travel path, on the basis of the orientation displacement amount;
    obtain a weighted translation force and a weighted rotational force after weighting the translation force and the rotational force, on the basis of specifications relating to acquired traveling of the vehicle;
    obtain a control command for achieving a target lateral force obtained by adding up the weighted translation force and the weighted rotational force; and
  output the control command; and
a braking actuator, a driving actuator, and a steering actuator of the vehicle that acquire the control command output from the control unit.

* * * * *